No. 751,388. PATENTED FEB. 2, 1904.
A. J. FARMER.
CENTRIFUGAL WASHER FOR FISH DRESSING MACHINES.
APPLICATION FILED NOV. 18, 1902.
NO MODEL. 2 SHEETS—SHEET 2.
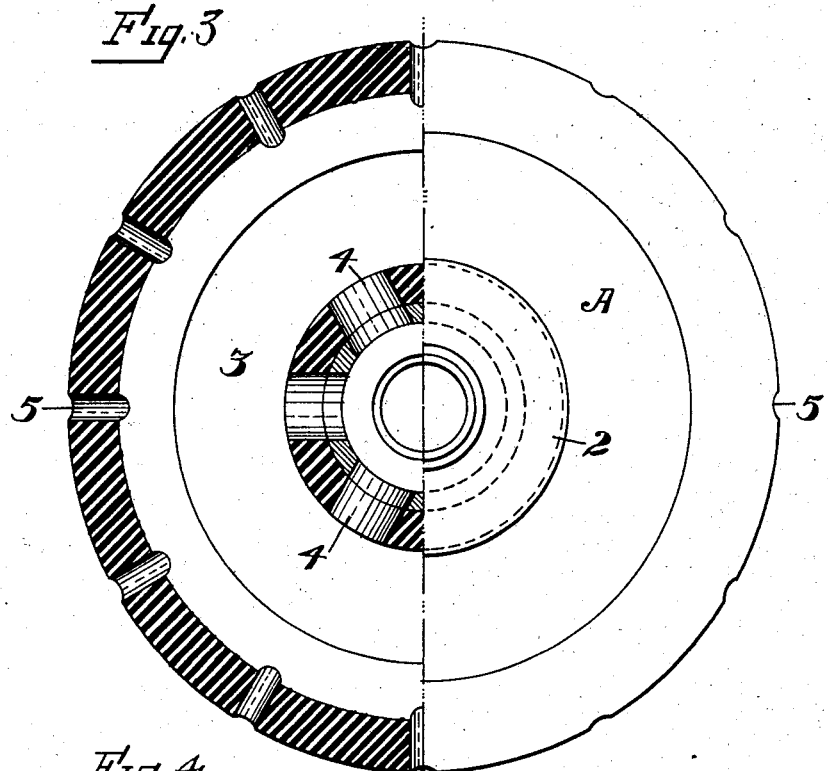
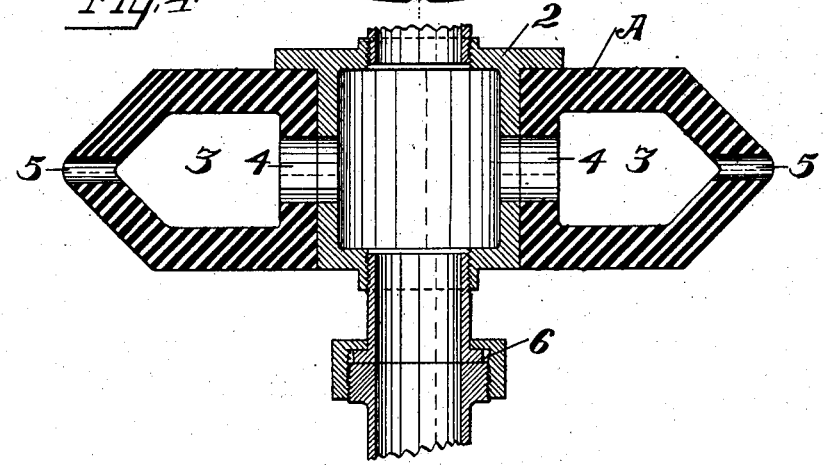

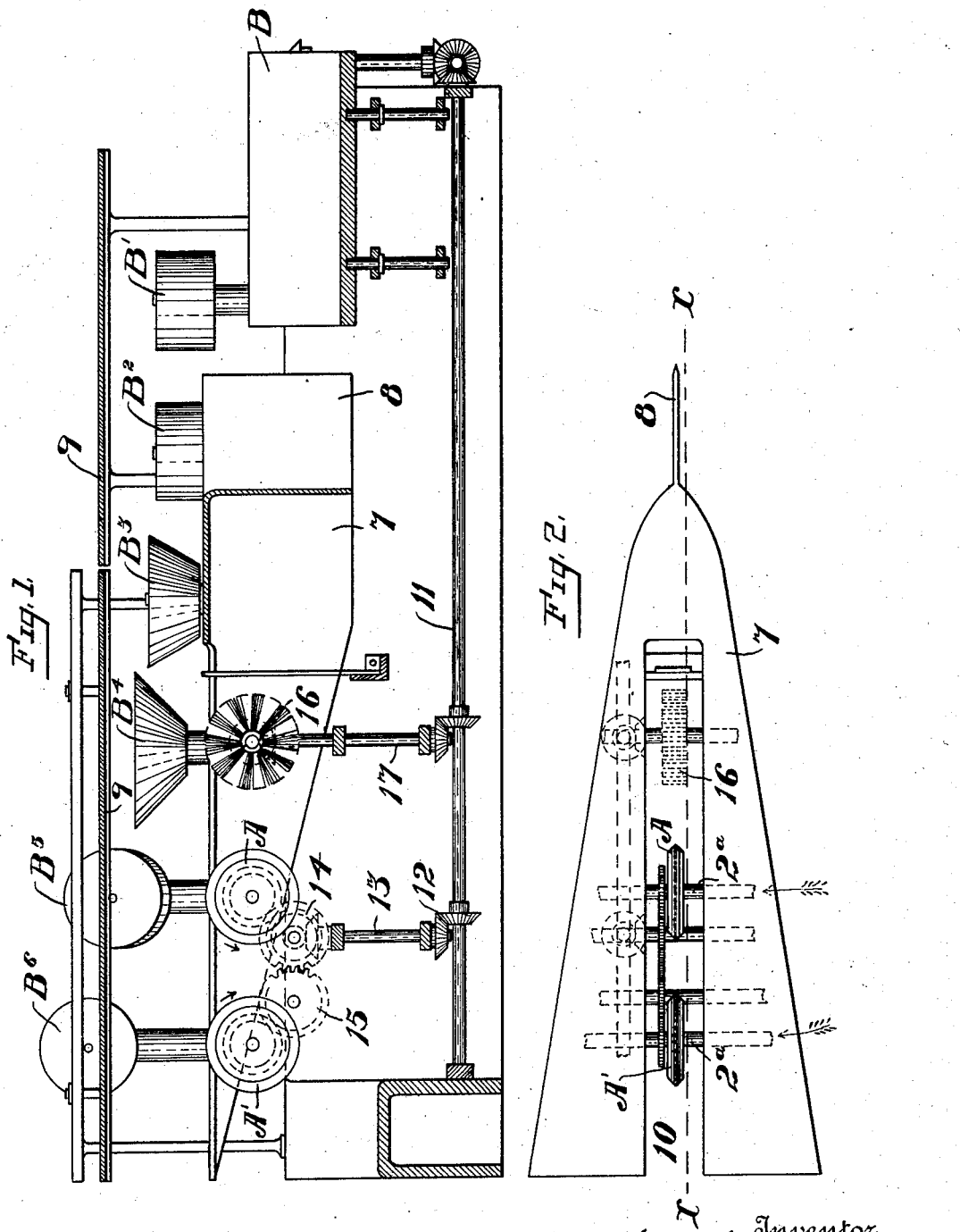

No. 751,388. Patented February 2, 1904.

UNITED STATES PATENT OFFICE.

ALBERT J. FARMER, OF SAN FRANCISCO, CALIFORNIA, ASSIGNOR TO THE CANNERS MACHINE CO., OF SAN FRANCISCO, CALIFORNIA, A CORPORATION OF CALIFORNIA.

CENTRIFUGAL WASHER FOR FISH-DRESSING MACHINES.

SPECIFICATION forming part of Letters Patent No. 751,388, dated February 2, 1904.

Application filed November 18, 1902. Serial No. 131,887. (No model.)

*To all whom it may concern:*

Be it known that I, ALBERT J. FARMER, a citizen of the United States, residing in the city and county of San Francisco, State of California, have invented an Improvement in Centrifugal Washers for Fish-Cleaning Machines; and I hereby declare the following to be a full, clear, and exact description of the same.

My invention relates to improvements in fish-cleaning machines, and particularly to an improved washer for cleansing the cavity of the fish after the fish have been split open and the entrails and soft portions removed. The particular class of fish-cleaning machines for which it has been designed comprises those machines which handle and dress the larger fish, such as salmon.

Usually a fish is fed into the machine between suitable guides and as it is carried forward is slit open, the entrails removed by brushes or scrapers, and a stream of water played into the cavity to cleanse it of blood and other refuse matter, the operation being automatic and continuous throughout.

My invention consists in substituting for the usual stationary jet-pipes a rotary washer, operating within the cavity similarly as the cleaning-brushes.

Having reference to the accompanying drawings, Figure 1 is a longitudinal vertical section through a fish-cleaning machine, showing my invention *in situ*. Fig. 2 is a plan of the spreader and washer mechanism. Fig. 3 is a side view, partly in section, of one of the washers. Fig. 4 is a transverse section of same.

My invention is illustrated in connection with a machine of the type shown and described in Letters Patent No. 710,912, issued to me October 7, 1902, in which the fish is introduced belly down into the machine and advanced between sets of rollers arranged in pairs into engagement with a cutter and tapered spreader, the fish slit open, and the entrails and soft portions removed. Fig. 1 shows a section of such a machine, wherein B represents a trough or chute through which the fish is fed belly down, and 7 is a hollow tapered bifurcated spreader in line with trough B and having a cutting portion 8, by which the fish is slit open. $B'$ $B^2$ $B^3$ $B^4$ $B^5$ $B^6$ represent a series of rollers arranged successively on one side of the spreader. It is to be understood that a corresponding series is disposed on the opposite side of the spreader and that these rollers thus arranged in pairs and driven in unison by suitable mechanism are adapted to seize the fish at the moment of its entry into the machine and carry it forward to the splitting-knife and beneath the guides 9, the separated sides of the fish passing gradually over the diverging surfaces of the spreader to allow of the cleansing of the fish-cavity. The guides 9 serve to hold the fish down in close contact with the spreader during the cleansing operation. The spreader is bifurcated, as shown, and in the open space 10 between the two wings are disposed the usual scrapers and brushes, which project upwardly to enter the cavity of the passing fish and remove the entrails and solid portions. Rearward of the scrapers and brushes are disposed the rotary washers A A', which constitute the essential features of my invention.

Referring to Figs. 3 and 4, A represents one of my improved washers, comprising a wheel made of suitable material, such as rubber or metal, having an outer covering of felt or the like mounted upon a hollow hub 2 and inclosing an annular water-space 3. The space 3 connects with the hollow of a shaft $2^a$ through passages 4, and is provided with radial discharge-outlets 5 of reduced diameter on the periphery of the wheel. A continuous supply of water is fed to the washer through a running joint 6, inclosing an end of shaft $2^a$. A washer when constructed of rubber is made in two complementary circular sections subsequently cemented and stitched together. It is desired that the washers be either of rubber or have some soft or resilient covering, as leather or felt, to prevent abrasion of the flesh of the fish, as the washers are driven at a high rate of speed and necessarily act in close proximity to the fish. The rims of the washers are rounded or beveled, as shown, in order to pass readily into the cavity of the fish. The rapid rotation of the washers causes the water to be thrown outwardly with great force to impinge upon the interior of the fish to be cleansed.

Preferably two washers are employed rotating in opposite directions, as shown in Fig. 1. Two washers so rotating act to better advantage on the interior of the fish than do two washers rotating in the same direction, since the discharging-columns are directed not only from different points, so that no part of the fish goes unwashed, but the commotion of the interfering streams banks up the water in the fish and gives it a most thorough flushing.

Any suitable means may be employed to operate the washers. In the present instance I have shown a line-shaft 11, receiving power from any suitable source and carrying a bevel-gear 12, engaging a corresponding gear on a short upright shaft 13. The latter has a gear intermeshing a gear on a cog-wheel 14 by which washer A is driven. Cog-wheel 14 engages a second cog-wheel 15, from which washer A' is driven in a direction opposite to washer A. The brush 16 may be operated from shaft 11 by means of suitable connections, including shaft 17.

The fish thus split open, disemboweled, and washed is ready for the subsequent operations of cutting and canning.

Having thus described my invention, what I claim as new, and desire to secure by Letters Patent, is—

1. In a fish-cleaning machine, the combination with means for spreading the cavity of the fish, of a rotary washer and means whereby it is axially supplied with water, said washer capable of discharging said water by centrifugal action.

2. In a fish-cleaning machine, a rotary washer having a yielding exterior surface and means whereby it is axially supplied with water, said washer having peripheral passages and discharging the water therethrough by centrifugal action.

3. In a fish-cleaning machine the combination with a water-supply pipe, of a washer rotatable thereon and having its interior communicating therewith, said washer having a yielding periphery and having peripheral passages through which the water is discharged by centrifugal action.

4. In a fish-cleaning machine and in combination with stationary means for spreading the cavity of the fish, a rotary washer positioned to enter and operate in the cavity said washer having peripheral discharge-passages and communications therebetween and a source of supply.

5. In a fish-cleaning machine, the combination with a spreader for opening the cavity of the fish, of a rotatable washer positioned to enter the cavity said washer including a wheel, mounted upon a hollow axle and inclosing an annular water-space, said wheel having discharge-outlets on its periphery and having passages communicating between the hollow of the axle and said water-space.

6. In a fish-cleaning machine, the combination with fish-supporting means including a slotted spreader, of a rotary hollow washer operatable in the slot of the spreader and means whereby it is axially supplied with water, said washer having peripheral openings through which the water is discharged by centrifugal action, and means for rotating said washer.

7. In a fish-cleaning machine, the combination with means for spreading the cavity of the fish, of a pair of oppositely-rotating hollow washers and means whereby they are axially supplied with water, and means for rotating the washers said washers having passages through which said water is discharged by centrifugal action.

In witness whereof I have hereunto set my hand.

ALBERT J. FARMER.

Witnesses:
S. H. NOURSE,
CHAS. E. TOWNSEND.